(No Model.)

E. D. BEAN.
FEED BAG.

No. 495,215. Patented Apr. 11, 1893.

WITNESSES:
F. M. Whipple
B. Sowers

INVENTOR:
E. D. Bean
by Wight, Brown & Crossley
attys.

UNITED STATES PATENT OFFICE.

EDWARD DAVIS BEAN, OF ARLINGTON, MASSACHUSETTS.

FEED-BAG.

SPECIFICATION forming part of Letters Patent No. 495,215, dated April 11, 1893.

Application filed December 2, 1892. Serial No. 453,856. (No model.)

*To all whom it may concern:*

Be it known that I, EDWARD DAVIS BEAN, of Arlington, in the county of Middlesex and State of Massachusetts, have invented certain new and useful Improvements in Feed-Bags, of which the following is a specification.

This invention has relation to devices adapted to hold grain or other feed, and to be attached to the heads of animals, particularly horses, for the purpose of feeding the same, when a manger or like contrivance is not at hand.

It is desirable, in all feed bags, that the same should be so constructed as that no feed can be wasted, that the animal cannot breathe upon or slabber his food, that he cannot gormandize or eat too greedily, and that he may be allowed to breathe with freedom while eating.

It is the object of my invention to attain all of these desirable ends in a single contrivance; and this I do with my invention, which consists in certain novel features of construction and arrangements of parts, which will be fully described hereinafter, and pointed out in the claims.

Reference is to be had to the annexed drawings and to the letters marked thereon, forming a part of this specification, the same letters designating the same parts or features, as the case may be, wherever they occur.

Figure 1:
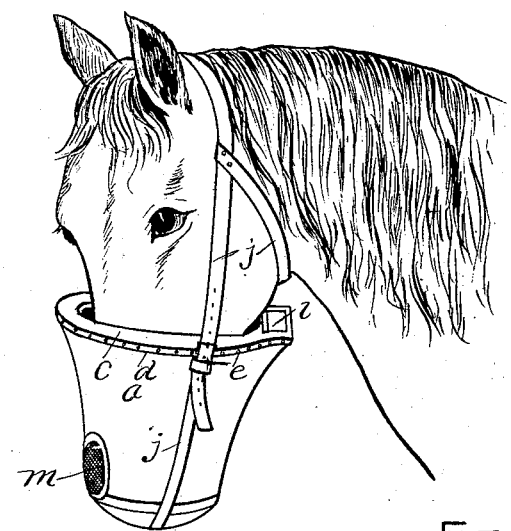
Figure 2:
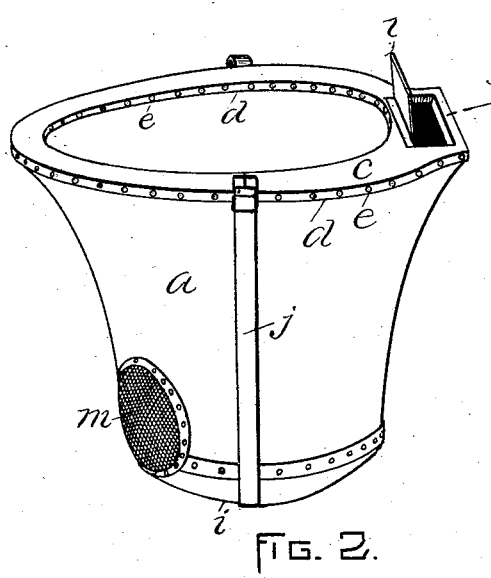
Figure 3:
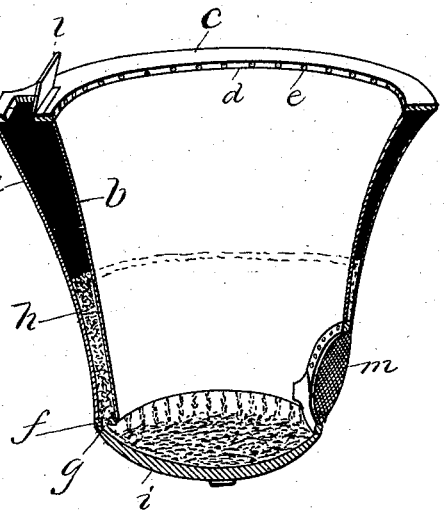

In the drawings: Figure 1 is a perspective view of the invention in use. Fig. 2 is a similar view on a larger scale, showing the door for filling the food chamber as open. Fig. 3 is a vertical central sectional view of Fig. 2.

In the drawings, $a$ designates the outer, and $b$ the inner wall of the feed-bag. These may be made of canvas, leather, or other suitable flexible material, though in some instances they may be composed of rigid substance.

$c$ designates the upper rim, which may consist of rigid material, to which the upper edges of the walls of the bag are secured by means of a band $d$ and tacks $e$, or in any other suitable way. At their bottom edges, the walls of the bag are secured to a rim $f$, in which are formed apertures $g$ to regulate the flow of the grain or other feed which may be placed in the chamber $h$ formed by maintaining the walls of the bag separated as described.

$i$ is the bottom of the bag, upon which the feed passing through the feed-flow regulating apertures $g$ may be taken up by the lips of the animal upon whose head the device may be secured by means of the straps $j$ or other suitable means.

$k$ is an aperture, closable by means of the door $l$, through which aperture the food chamber $h$ may be supplied with grain or other substance.

$m$ designates a foraminous space, arranged opposite the point where the feeding animal's nose may come, so as to afford the said animal free opportunity to breathe, and so prevent discomfort to the animal and slabbering by him of his food.

With this invention, it will be seen that, though the feeding animal might toss his head to any extent, no feed can be thrown out of the bag; and that, as the food is supplied upon the bottom no faster than should be properly eaten, the feeding animal is prevented from gormandizing himself. Furthermore, as the food not being directly eaten is retained in the food chamber, it is kept out of the way of being befouled by being continuously breathed upon or becoming beslabbered. The restriction of the egress from the feed chamber only allows the feed to pass into the mouth of the bag as it is consumed and this permits of the location of the foraminous space close to the bottom of the bag without danger of its becoming clogged or closed by the feed, and in a position directly in front of the feeding animal's nostrils. It will be observed that the inlet door is located on the side opposite that where the foraminous space occurs, and hence comes under the horse's throat and owing to this location, the feed will not escape through it when the animal tosses his head.

Having thus explained the nature of the invention and described a way of constructing and using the same, though without attempting to set forth all the forms in which it may be made or all of the modes of its use, it is declared that what is claimed is—

1. A feed-bag comprising in its construction flexible inner and outer walls forming between them an annular feed-chamber, a rigid upper rim, to the inner and outer edges of which the upper edges of the flexible walls are secured, said rim closing the upper end of the annular feed chamber and having a door through which the feed may be introduced, a rigid rim to which the lower edges of the flexible walls are secured, said rim having apertures for the egress of the contents of the feed chamber, and a bottom onto which feed passes from said apertures.

2. A feed-bag comprising in its construction flexible inner and outer walls forming between them an annular feed chamber, a foraminous space in the walls near the lower end of the bag at a position to be directly in front of the feeding animal's nose, a rigid rim to the inner and outer edges of which the upper edge of the flexible walls are secured, said rim having a door at the side opposite that in which the foraminous space occurs, whereby such door has position under the feeding animal's throat, a bottom, and means of restricted communication between the annular feed chamber and said bottom.

In testimony whereof I have signed my name to this specification, in the presence of two subscribing witnesses, this 31st day of October, A. D. 1892.

EDWARD DAVIS BEAN.

Witnesses:
ARTHUR W. CROSSLEY,
F. M. WHIPPLE.